United States Patent [19]

Schaller et al.

[11] 4,223,841

[45] Sep. 23, 1980

[54] ARRANGEMENT FOR WASHING LENSES OF HEADLIGHTS

[75] Inventors: Gotthilf Schaller, Leonberg; Eckhard Ursel, Bühl; Werner Fritsch, Gaggenau; Horst Seibicke, Bühl-Altschweier; Wolfgang Dostler, Lauf, all of Fed. Rep. of Germany

[73] Assignee: Robert Bosch GmbH, Stuttgart, Fed. Rep. of Germany

[21] Appl. No.: 850,094

[22] Filed: Nov. 8, 1977

[30] Foreign Application Priority Data

Nov. 30, 1976 [DE] Fed. Rep. of Germany ....... 2654228

[51] Int. Cl.² .............................................. B05B 1/10
[52] U.S. Cl. ................................. 239/284 A; 239/601
[58] Field of Search ................. 239/284 A, 488–491, 239/601, 597, 599

[56] References Cited

U.S. PATENT DOCUMENTS

| 1,668,271 | 5/1928 | Fisk | 239/601 X |
| 1,688,585 | 10/1928 | Lalor | 239/488 |
| 1,738,489 | 12/1929 | Williams | 239/498 X |
| 2,305,210 | 12/1942 | Wahlin | 239/601 |
| 3,072,346 | 1/1963 | Wahlin et al. | 239/601 X |
| 3,656,691 | 4/1972 | Norstrand | 239/284 A |

FOREIGN PATENT DOCUMENTS 1441952  7/1976  United Kingdom ............... 239/284 A Primary Examiner—Robert B. Reeves
Assistant Examiner—Gene A. Church
Attorney, Agent, or Firm—Michael J. Striker

[57] ABSTRACT

An arrangement for washing lenses of headlights has means for conveying a washing liquid, and a nozzle provided with a passage having an inlet portion communicating with the conveying means for admitting the washing liquid into the nozzle and an outlet portion having an open end for issuing the washing liquid from the nozzle. The outlet portion of the passage of the nozzle diverges towards the open end thereof, whereas the open end has a shape such that the flow of the washing liquid issuing from the nozzle has a shape corresponding to the shape of the lens to be washed. The outlet portion of the passage of the nozzle may be formed as a through bore open at an end face of the nozzle facing towards the lens to be washed, and the open end of the thus-formed outlet portion may have a shape corresponding to the shape of the lens. The outlet portion of the passage of the nozzle may also be defined by two grooves formed in a section of the nozzle adjacent to the end face thereof and open at the latter.

15 Claims, 19 Drawing Figures

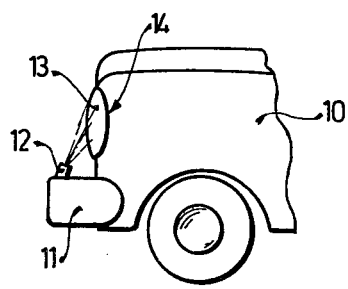
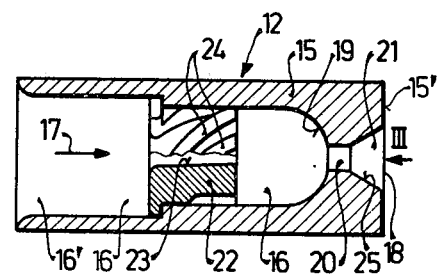
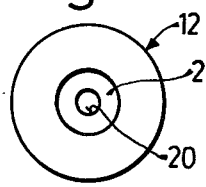
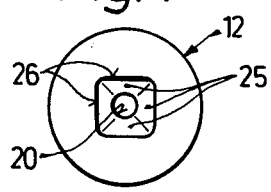
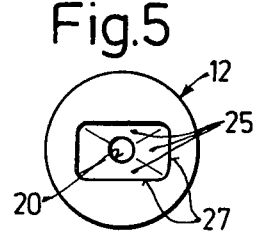
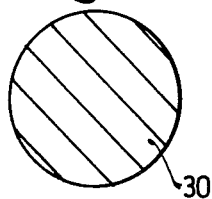
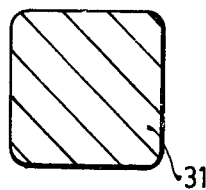
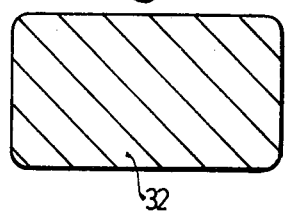
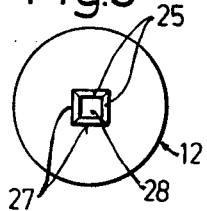
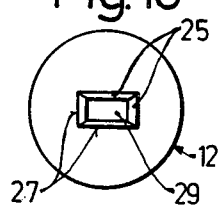
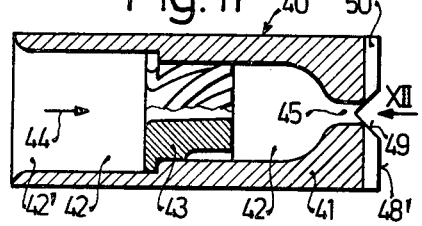

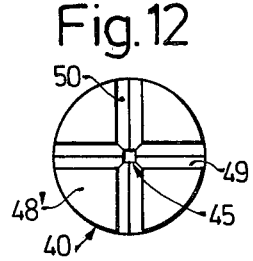
Fig. 12
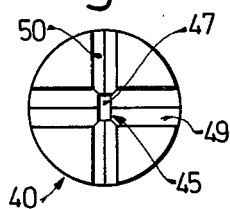
Fig. 13
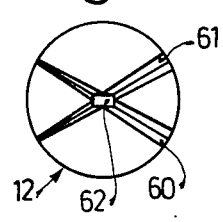
Fig. 16
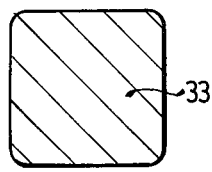
Fig. 14
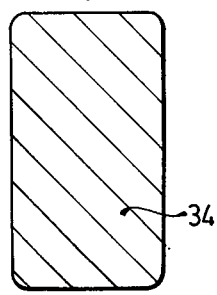
Fig. 15
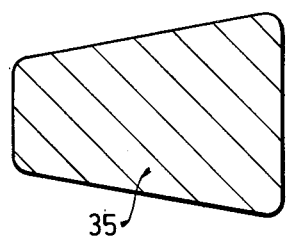
Fig. 17
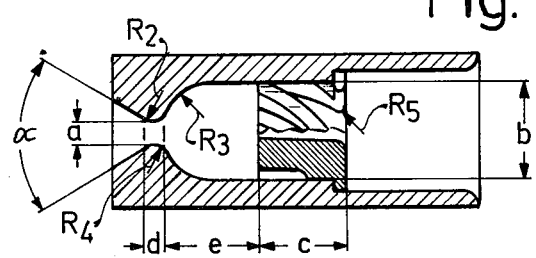
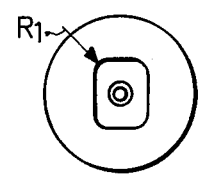
Fig. 18
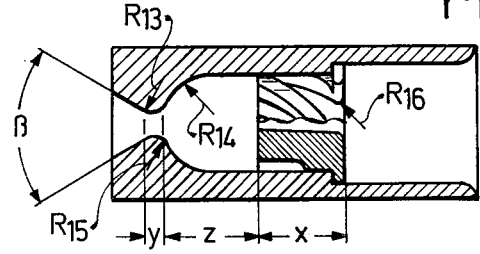
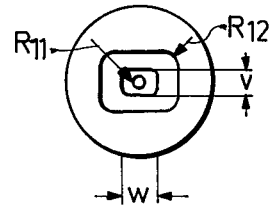
Fig. 19

ARRANGEMENT FOR WASHING LENSES OF HEADLIGHTS

BACKGROUND OF THE INVENTION

The present invention relates to an arrangement for washing lenses of headlights of vehicles.

Washing arrangements for washing lenses of headlights of vehicles have been proposed in the art. Such arrangements have means for conveying a washing liquid, and a nozzle provided with a passage having an inlet communicating with the conveying means and an outlet open towards the lens to be washed. The flow of the washing fluid issues from the outlet of the nozzle and acts upon a circular surface. However, in the case when the lens to be washed has a shape deviating from the circular shape the washing liquid is either wasted or does not wash substantial regions of the lens, so that the lens is not satisfactorily cleaned.

It has also been proposed for washing elongated lenses to provide two nozzles, each of which washes a respective portion of the elongated lens. In this construction in order to obtain at least the above number of washing ranges, a container with the washing liquid must be substantially increased which regularly is unavoidable in connection with the room provided for the container.

SUMMARY OF THE INVENTION

Accordingly, it is an object of the present invention to provide an arrangement for washing lenses of headlights, which avoids the disadvantages of the prior art.

More particularly, it is an object of the present invention to provide an arrangement for washing lenses of headlights in which the flow of washing liquid issuing from the arrangement substantially corresponds to the shape of the lens to be washed.

Another object of the present invention is to provide an arrangement for washing lenses of headlights, in which a washing liquid is not substantially wasted and at the same time washes substantially all the portions of the lens.

A further object of the present invention is to provide an arrangement for washing lenses of headlights, in which a single nozzle may be used for washing such a lens, such as a rectangular lens so that it is not necessary to use a row of nozzles for washing the same lens.

In keeping with these objects, and with others which will become apparent hereinafter, one feature of the present invention resides, briefly stated, in an arrangement for washing lenses of headlights having means for conveying a washing liquid and a nozzle having a passage communicating with the conveying means and open towards the lens to be washed, in which an outlet portion of the passage diverges towards an open end thereof, and the open end has a shape such that the flow of washing liquid issuing from the nozzle has a shape corresponding to the shape of the lens to be washed.

In such a construction, when the arrangement is used for washing non-circular lenses, the washing liquid is not excessively wasted, nor do portions of the lenses remain unwashed. It is also not necessary to provide a row of nozzles for washing one lens, e.g. a non-circular lens.

Another feature of the present invention is that the open end of the outlet portion of the passage may have a shape substantially corresponding to the shape of the lens to be washed, and the outlet portion of the passage is formed as a through bore communicating with the remainder of the passage and open at the end face of the nozzle.

A further feature of the present invention is that the outlet portion of the passage of the nozzle may be defined by two grooves formed at an end face of the nozzle and open at the latter. The grooves may intersect one another and extend in directions corresponding to the directions in which the diagonals of the end face of the nozzle extend. The grooves may be wedge-shaped.

A still further feature of the present invention is that the passage of the nozzle may have a constricted portion having a cross-section which is reduced as compared with the cross-section of the remainder of the passage. The constricted portion of the passage is located between the inlet portion and the outlet portion thereof and may have a cross-section substantially corresponding to the shape of the lens to be washed. The constricted portion may have a uniform cross-section and may smoothly merge into the open end of the passage.

An additional feature of the present invention is that the outlet portion of the passage may have a cross-section corresponding to the shape of the lens to be washed. The outlet portion of the passage and the open end of the outlet portion may also be oriented in correspondence with the orientation of the lens to be washed.

A still additional feature of the present invention is that one of the grooves which are formed at the end face of the nozzle, may have a depth exceeding the depth of the other groove. It is also possible that when the lens to be washed has one side portion of a reduced dimension, the grooves formed at the end face of the nozzle may have a section of a reduced depth corresponding to the location of the reduced portion of the lens.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a front portion of a vehicle provided with an arrangement for washing lenses of headlights;

FIG. 2 is an enlarged longitudinal section of a nozzle of the washing device in accordance with one embodiment of the present invention;

FIG. 3 is a view of the nozzle in the direction of arrow III of FIG. 2;

FIG. 4 is a view corresponding to FIG. 3 but showing another nozzle in accordance with the above embodiment of the present invention;

FIG. 5 is a view corresponding to FIG. 3 but showing a still further nozzle in accordance with the above embodiment of the present invention;

FIG. 6 is a view showing a surface upon which the flow of washing liquid issuing from the nozzle shown in FIG. 3 acts;

FIG. 7 is a view showing the surface upon which the flow of washing liquid issuing from the nozzle shown in FIG. 4 acts;

FIG. 8 is a view showing the surface upon which the flow of washing liquid issuing from the nozzle shown in FIG. 5 acts;

FIG. 9 is a view corresponding to FIG. 3 but showing a nozzle in accordance with another embodiment of the present invention;

FIG. 10 is a view corresponding to the view shown in FIG. 9 but showing another nozzle in accordance with the other embodiment of the present invention;

FIG. 11 is an enlarged longitudinal section of the nozzle in accordance with a further embodiment of the present invention;

FIG. 12 is a view of the nozzle in the direction of arrow XII of FIG. 11;

FIG. 13 is a view corresponding to FIG. 12 but showing another nozzle in accordance with the further embodiment of the present invention;

FIG. 14 is a view showing a surface upon which the flow of liquid issuing from the nozzle shown in FIG. 12 acts;

FIG. 15 is a view showing the surface on which the flow of liquid issuing from the nozzle shown in FIG. 13 acts;

FIG. 16 is a view corresponding to FIG. 12 but showing a further nozzle in accordance with the invention;

FIG. 17 is a view showing the surface upon which the flow of washing liquid issuing from the nozzle shown in FIG. 16 acts;

FIG. 18 is a longitudinal section and a side view of a nozzle with dimensions indicated thereon; and FIG. 19 is a longitudinal section and a side view of another nozzle with dimensions indicated therein.

DESCRIPTION OF THE PREFERRED EMBODIMENTS

As shown in FIG. 1, a vehicle 10 has a nozzle 12 of an arrangement for washing a lens 13 of a headlight 14, which nozzle 12 is located in the region of a bumper 11 of the vehicle 10 and has an outlet for issuing a washing liquid in the direction towards the lens 13 to be washed. The flow of washing liquid issues from the outlet of the nozzle 12 under pressure in a form of a plurality of drops, and cleans the lens of the headlight without the aid of wiping elements.

The principle construction of the nozzle 12 is shown in FIG. 2. The nozzle 12 has a body member 15 provided with a passage 16 through which the washing liquid flows from a not-shown supply conduit and in the direction of arrow 17. The passage 16 has an inlet portion 16' communicating with the above conduit, and an outlet portion 21 facing towards the lens 13 to be washed and having an open end 18. The outlet portion 21 of the passage 16 diverges towards the open end 16 thereof. The passage 16 has a portion 19 of a gradually reduced cross-section merging into a constricted portion 20 of a cross-section which is reduced as compared with the cross-section of the remainder of the passage 16. The constricted portion 20 of the passage 16 is located at the opposite side of the outlet portion 21 relative to the open end 18.

A spinning member 22 is located between the constricted portion 20 of the passage 16 and the inlet portion 16' of the latter. The spinning member 22 has a central passage 23 and a plurality of grooves 24 formed at an outer surface of the spinning member 22. The diverged outlet portion 21 of the passage 16 is formed so that wall surfaces 25 of the body member 15 are funnel-shaped and merge into the constricted portion 20 of the passage 16.

As shown in FIG. 2, the outlet portion 21 of the passage 16 is a through bore which communicates with the remainder of the passage 16 and is open at an end face 15' of the body member 15. An open end 18 of the outlet portion 21 has a shape such that the flow of water issuing from the nozzle 12 has a shape substantially corresponding to the shape of the lens 13 to be washed. In connection with this, the open end 18 of the outlet portion 21 has a shape substantially corresponding to the shape of the lens 13. As shown in FIG. 3, the open end 18 of the outlet portion 21 has a circular cross-section, and it is understood that such a nozzle is suitable for washing the circular lenses. The wall surface 25 of the outlet portion 21 is conical, and the outlet portion 21 has a circular cross-section corresponding to the shape of the circular lens to be washed. Finally, the constricted portion 20 of the passage 16 also has a circular cross-section.

The nozzle shown in FIG. 4 is suitable for washing lenses of a square shape. As shown in this Figure, the edges 26 define an open end of the outlet portion 21 of the passage 16 which has a shape corresponding to the shape of the square lens to be washed. The wall surfaces 25 of the outlet portion 21 together form a pyramid extending from the constricted portion 20 in the direction of the flow of washing liquid 17, and the outlet portion 21 of the passage 16 has a square cross-section.

The nozzle shown in FIG. 5 is suitable for washing rectangular lenses. Edges 27 define such an open end of the outlet portion 21 of the passage which has a rectangular shape. The wall surfaces 25 of the outlet portion 21 together form a rectangle extending from the constricted portion 20 of the passage 16 in the direction of the flow of washing fluid 17. The outlet portion 21 of the passage 16 has a rectangular cross-section.

FIGS. 6, 7 and 8 show cross-sections of the flow of washing liquid issuing from the nozzles shown in FIGS. 2–5. The cross-section of the flow of washing fluid depends upon the shape of the open end 18 of the outlet portion 21 of the passage 16, as well as upon the constriction of the wall surfaces 25 and the cross-section of the outlet portion 21 of the passage 16. The flow of washing fluid issuing from the nozzle shown in FIG. 3 has a circular cross-section 30 illustrated in FIG. 6, the flow of washing fluid issuing from the nozzle shown in FIG. 4 has a square cross-section 31 illustrated in FIG. 7, and the flow of washing liquid issuing from the nozzle shown in FIG. 5 has a rectangular cross-section 32 illustrated in FIG. 8. The flow of washing fluid assumes its shape when it passes through the constricted portion 20 of the passage 16 and abuts the wall surfaces 25 of the outlet portion 21 of the passage 16. The specific construction and shape of the wall surfaces 25 and the outlet portion 21 of the passage 16 assure that the thus-formed flow of washing fluid performs the required cleaning of the lenses, since the cross-section of the flow of washing liquid acts upon such a surface which corresponds to the shape of the lens 13 to be washed. In this sense, FIGS. 6–8 can be also considered as showing the shape of the surfaces upon which the flow of washing liquid acts.

In the nozzles shown in FIGS. 4 and 5 a cross-section of the constricted portion 20 of the passage 16 does not correspond to the shape of the open end 18 of the outlet portion 21 and to the cross-section of the latter. However, it is advantageous when such a correspondence is provided, that is when a cross-section of the constricted portion 20 of the passage 16 of the nozzle has a cross-section substantially corresponding to the shape of the lens 13 to be washed. As shown in FIG. 9, the cross-section of a constricted portion 28 of the passage 16 is square so as to improve the formation of the flow of washing fluid having a square cross-section. As shown in FIG. 10, a constricted portion 29 of the passage 16 has a rectangular cross-section so as to improve the formation of the flow of washing liquid having a rectangular cross-section. It is understood that the wall surfaces of the outlet portions 21 of the nozzles shown in FIGS. 9 and 10 are arranged similarly to the wall surfaces 25 of the nozzles shown in FIGS. 4 and 5. It is also important to provide a continuous transition from the constricted portion 20 of the passage 16 to the open end 18 of the outlet portion 21 thereof.

FIG. 11 shows a nozzle 40 of the arrangement in accordance with another embodiment of the present invention. Similarly to the nozzle shown in FIG. 2, the nozzle 40 has a passage 42 with an inlet portion 42', in which passage a spinning member 43 is located. The passage 42 has a constricted portion 45 having a cross-section which is reduced as compared with the cross-section of the remainder of the passage 42. The cross-section of the constricted portion 45 is again selected in accordance with the shape of the lens 13 to be washed. Thus, in order to wash a square lens the constricted portion 45 of the passage 42 has a square cross-section as shown in FIG. 12, so that the flow of washing fluid issuing from the nozzle assumes the square cross-section 33 illustrated in FIG. 14. In order to wash a rectangular lens, the constricted portion 45 of the passage 42 has a rectangular cross-section as shown in FIG. 13, so that the flow of liquid issuing from the nozzle assumes the rectangular cross-section 34 illustrated in FIG. 15.

However, in this embodiment of the invention the outlet portion of the passage 42 of the nozzle 40 is constructed somewhat different as compared with the construction of the outlet portion 21 of nozzle 12 shown in FIG. 2. The outlet portion of the passage 42 of the nozzle 40 is defined by two wedge-shaped grooves 50 which are formed in the section of the nozzle 40 adjacent to an end face 48 of the latter and have an open end 48' formed at the above end face. These grooves are shown in FIGS. 12, 13 and 16. They intersect one another and extend in direction substantially corresponding to the diagonals of the end face 48 of the nozzle 40.

The groove 49 shown in FIG. 12 has a depth equal to the depth of the groove 50. Since the nozzle shown in this Figure has the constricted portion 45 of a square cross-section and the two grooves 49 and 50 have equal depth and extend substantially normal to at least one edge of the square constricted portion 45, the flow of washing liquid issuing from the nozzle has an exactly formed and maintained the square cross-section 33.

The groove 49 of the nozzle shown in FIG. 13 has a depth exceeding the depth of the groove 50 and is located transverse to the longitudinal direction in which the rectangular constricted portion 45 of the passage 42 extends. The difference in depth of the grooves 49 and 50 shown in FIG. 13 further improves the formation of the flow of washing liquid having the rectangular cross-section 34.

FIG. 16 shows a nozzle having a constricted portion 62 of a rectangular cross-section. In this nozzle two grooves 60 and 61 intersect one another at an acute angle, and a section of each of the grooves located at one side of the passage 62 has a depth exceeding the depth of the section located at the other side of the passage 62. Preferably each of the grooves has a depth gradually decreasing from the first-mentioned section to the second-mentioned section thereof. The flow of washing fluid issuing from the nozzle 12 having the thus-constructed groove has a trapezoidal cross-section 35 shown in FIG. 17 and corresponding to the trapezoidal shape of the lens 13 to be washed. It is also advantageous when the constricted portion 62 of the passage of the nozzle also has the above trapezoidal cross-section.

It is understood that the open end and the outlet portion of the passages of the nozzles, and therefore the nozzles themselves must be so oriented, that the orientation of the flow of washing liquid corresponds to the orientation of the orientation of the lens to be washed, or in other words, the flow of washing liquid must cover the lens to be washed.

Advantageous dimensions of the nozzle shown in FIG. 18 are presented in Table 1 which dimensions are selected with consideration of the distance between the nozzle and the lens to be washed, the dimension of the lens, the spatial location of the lens, the curvature of the lens and with relation to the criteria of the cleaning action of the flow of washing liquid.

TABLE 1

| Pressure (bar) | Quantity of washing liquid (L/min) | a (mm) | c (mm) | d (mm) | e (mm) | b (mm) | α (°) | $R_1$ (mm) | $R_2$ (mm) | $R_3$ (mm) | $R_4$ (mm) | $R_5$ (mm) |
|---|---|---|---|---|---|---|---|---|---|---|---|---|
| 2–4 | 3–8 | 1,8 + 0.1 | 6–8 | 1,0–2,0 | 7,5–9,5 | 6–10 | ** | 0,5–2 | 0,5–1,5 | 3–5 | 0–1,0 | 0,3–1 |
| 1,5–6 | 1–10 | 1,2–2,5 | 4–10 | 0–2,0 | 5,5–10 | 4–10 | ** | 0–3 | 0–2 | 2–6 | 0–2 | 0–3 |

**to be determined by geometry of the headlight

In Table 2 advantageous dimensions of the nozzle shown in FIG. 19 are presented.

TABLE 2

| Pressure (bar) | Quantity of washing liquid (L/min) | v (mm) | w (mm) | x (mm) | y (mm) | z (mm) | β (°) | $R_{11}$ (mm) | $R_{12}$ (mm) | $R_{13}$ (mm) | $R_{14}$ (mm) | $R_{15}$ (mm) | $R_{16}$ (mm) |
|---|---|---|---|---|---|---|---|---|---|---|---|---|---|
| 2–4 | 3–8 | 1.5–1.7 | 2.1–2.3 | 6–8 | 1.0–2.0 | 7.5–9.5 | ** | 0.2–1 | 0.5–2 | 0.5–1.5 | 3–5 | 0–1.0 | 0.3–1 |
| 1.5–6 | 1–10 | 1–1.8 | 1.5–3 | 4–10 | 0–2 | 5.5–10 | ** | 0–2 | 0–3 | 0–2 | 2–6 | 0–2 | 0–3 |

** to be determined by geometry of the headlight

It will be understood that each of the elements described above, or two or more together, may also find a useful application in other types of constructions differing from the types described above.

While the invention has been illustrated and described as embodied in an arrangement for washing lenses of headlights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for washing headlight lenses of rectangular outline, comprising means for conveying a washing liquid; and a nozzle provided with a passage having an inlet portion communicating with said conveying means for admitting the washing liquid into said nozzle and an outlet portion diverging toward an open end for discharging the washing liquid from said nozzle and towards the lens to be washed, said outlet portion being bounded by planar surface facets which surround said outlet portion to said open end thereof, and said open end of said outlet portion of said passage having a cross-sectional shape corresponding at least substantially to said outline of the lens to be washed.

2. The arrangement as defined in claim 1, wherein said nozzle has an end face facing towards the lens to be washed, said outlet portion of said passage being a through bore communicating with the remainder of said passage and open at said end face of said nozzle.

3. The arrangement as defined in claim 1, wherein said passage of said nozzle has a constricted portion having a reduced cross-section as compared with the cross-section of the remainder of said passage, said constricted portion of said passage being located between said inlet portion and said outlet portion of said passage and communicating with said outlet portion and the remainder of said passage.

4. The arrangement as defined in claim 3, wherein said cross-section of said constricted portion of said passage is uniform.

5. The arrangement as defined in claim 4, wherein said constricted portion of said passage smoothly merges into said open end of said outlet portion of said passage.

6. The arrangement as defined in claim 3, wherein said constricted portion of said passage has a cross-section substantially corresponding to the shape of the lens to be washed.

7. The arrangement as defined in claim 3, wherein said nozzle has a spinning member for spinning the washing liquid and located between said constricted portion and said inlet portion of said passage.

8. The arrangement as defined in claim 1, wherein said open end of said outlet portion of said passage of said nozzle has an orientation substantially corresponding to the orientation of the lens to be washed.

9. The arrangement as defined in claim 8, wherein an orientation of said outlet portion of said passage of said nozzle substantially corresponds to the orientation of the lens to be washed.

10. An arrangement for washing lenses of headlights, particularly a lens which is smaller at one of its sides than at its other side, comprising means for conveying a washing liquid; a nozzle provided with a passage having an inlet portion communicating with said conveying means for admitting the washing liquid into said nozzle and an outlet portion having an open end for issuing the washing liquid from said nozzle and towards the lens to be washed, said outlet portion diverging towards said open end thereof, said nozzle having an end face facing towards the lens to be washed and an end section adjacent to said end face, said outlet portion of said passage being defined by two grooves formed in said end section of said nozzle and open at said end face thereof, each of said grooves having one section and another section each corresponding to a respective portion of the lens, said one section of each of said grooves having a depth exceeding the depth of said other section thereof so that the flow of washing liquid issuing from said nozzle has a shape substantially corresponding to the shape of the lens to be washed.

11. The arrangement as defined in claim 10, wherein said grooves intersect one another.

12. The arrangement as defined in claim 11, wherein said grooves diagonally intersect one another.

13. The arrangement as defined in claim 12, wherein said grooves are wedge-shaped.

14. The arrangement as defined in claim 10, wherein the depth of one of said grooves exceeds the depth of the other groove.

15. The arrangement as defined in claim 10, wherein each of said grooves has a depth smoothly decreasing in the direction from said one section towards said other section thereof.

* * * * *